US008672216B2

(12) United States Patent
Beemer et al.

(10) Patent No.: US 8,672,216 B2
(45) Date of Patent: Mar. 18, 2014

(54) FLAT CARD PRODUCTION SYSTEMS AND METHODS

(75) Inventors: Layne D Beemer, Blair, NE (US); Ronald L Prchal, Plattsmouth, NE (US)

(73) Assignee: First Data Corporation, Greenwood Village, CO (US)

( * ) Notice: Subject to any disclaimer, the term of this patent is extended or adjusted under 35 U.S.C. 154(b) by 295 days.

(21) Appl. No.: 12/423,633

(22) Filed: Apr. 14, 2009

(65) Prior Publication Data

US 2010/0258623 A1   Oct. 14, 2010

(51) Int. Cl.
*G06F 17/00* (2006.01)

(52) U.S. Cl.
USPC ............. 235/375; 235/487; 235/380; 705/35; 705/39

(58) Field of Classification Search
USPC ......... 235/380, 487, 492, 382, 493, 375, 379; 705/5, 26.1, 33, 35, 39, 41, 51
See application file for complete search history.

(56) References Cited

U.S. PATENT DOCUMENTS

| | | | |
|---|---|---|---|
| 4,034,210 A * | 7/1977 | Hill et al. ................. | 235/487 |
| 4,528,643 A | 7/1985 | Freeny, Jr. | |
| 4,700,055 A | 10/1987 | Kashkashian, Jr. | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson | |
| 5,513,117 A | 4/1996 | Small | |
| 5,541,395 A | 7/1996 | Hill et al. | |
| 5,557,516 A | 9/1996 | Hogan | |
| 5,592,400 A | 1/1997 | Sasou | |
| 5,637,845 A | 6/1997 | Kolls | |
| 5,678,010 A | 10/1997 | Pittenger et al. | |
| 5,721,768 A | 2/1998 | Stimson et al. | |
| 5,746,451 A | 5/1998 | Weyer | |
| 5,774,168 A | 6/1998 | Blome | |
| 5,796,832 A | 8/1998 | Kawan | |
| 5,868,236 A | 2/1999 | Rademacher | |
| 5,903,633 A | 5/1999 | Lorsch | |
| 5,921,581 A | 7/1999 | LaLande | |
| 5,936,221 A | 8/1999 | Corder et al. | |
| 5,984,181 A | 11/1999 | Kreft | |
| 5,987,438 A | 11/1999 | Nakano et al. | |
| 5,991,748 A | 11/1999 | Taskett | |

(Continued)

OTHER PUBLICATIONS

P420 Maintenance Manual, Elton Card Printer Products, Manual No. 980297-001, Revision A, 2001.

*Primary Examiner* — Michael G Lee
*Assistant Examiner* — Tabitha Chedekel
(74) *Attorney, Agent, or Firm* — Kilpatrick Townsend & Stockton LLP

(57) ABSTRACT

Systems and methods for producing a presentation instrument involve receiving an image file having an account number stamp, and producing the image file onto a piece of stock material, such that a visible account number corresponding to the account number stamp is created on the stock material. The visible account number is scanned with a reader. An account number record is encoded onto a presentation instrument, and compared with the scanned visible account number.

20 Claims, 7 Drawing Sheets

(56) References Cited

U.S. PATENT DOCUMENTS

| | | |
|---|---|---|
| 6,006,988 A | 12/1999 | Behrmann et al. |
| 6,074,312 A | 6/2000 | Lyon et al. |
| 6,129,275 A | 10/2000 | Urquhart et al. |
| 6,169,975 B1 | 1/2001 | White et al. |
| 6,193,155 B1 | 2/2001 | Walker et al. |
| 6,295,522 B1 | 9/2001 | Boesch |
| 6,298,336 B1 | 10/2001 | Davis et al. |
| 6,405,182 B1 | 6/2002 | Cuervo |
| 6,473,500 B1 | 10/2002 | Risafi et al. |
| 6,510,983 B2 | 1/2003 | Horowitz et al. |
| 6,829,519 B2 | 12/2004 | Liberty et al. |
| 6,912,312 B1 | 6/2005 | Milner et al. |
| 7,117,173 B1 | 10/2006 | Ambani |
| 7,191,938 B2 | 3/2007 | Pittroff |
| 7,258,272 B2 | 8/2007 | Yoshizane et al. |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0082885 A1 | 6/2002 | Pittroff |
| 2002/0103711 A1 | 8/2002 | Karas et al. |
| 2002/0128962 A1 | 9/2002 | Kasower |
| 2002/0174016 A1 | 11/2002 | Cuervo |
| 2003/0004997 A1 | 1/2003 | Parker et al. |
| 2003/0018587 A1 | 1/2003 | Altoff et al. |
| 2003/0023557 A1 | 1/2003 | Moore |
| 2003/0053609 A1 | 3/2003 | Risafi et al. |
| 2003/0065624 A1 | 4/2003 | James et al. |
| 2003/0084647 A1 | 5/2003 | Smith et al. |
| 2003/0085161 A1 | 5/2003 | Smith et al. |
| 2003/0088552 A1 | 5/2003 | Bennett et al. |
| 2003/0160444 A1 | 8/2003 | Durso |
| 2003/0222135 A1 | 12/2003 | Stoutenburg et al. |
| 2004/0046027 A1* | 3/2004 | Leone et al. ............ 235/462.13 |
| 2004/0068437 A1 | 4/2004 | McGee et al. |
| 2004/0098326 A1 | 5/2004 | James et al. |
| 2004/0099730 A1 | 5/2004 | Tuchler et al. |
| 2004/0155960 A1 | 8/2004 | Wren et al. |
| 2004/0193551 A1 | 9/2004 | McGee et al. |
| 2004/0205138 A1 | 10/2004 | Friedman et al. |
| 2004/0211830 A1 | 10/2004 | Algiene |
| 2004/0254833 A1 | 12/2004 | Algiene |
| 2005/0116027 A1 | 6/2005 | Algiene et al. |
| 2005/0165667 A1 | 7/2005 | Cox |
| 2005/0275870 A1 | 12/2005 | Elarde et al. |
| 2006/0091223 A1* | 5/2006 | Zellner et al. ................ 235/492 |
| 2006/0136257 A1 | 6/2006 | Pittroff |
| 2007/0102510 A1 | 5/2007 | Beemer et al. |
| 2007/0215239 A1 | 9/2007 | Dorney |

* cited by examiner

FLAT CARD PRODUCTION SYSTEMS AND METHODS

CROSS-REFERENCES TO RELATED APPLICATIONS

This application is related to U.S. patent application Ser. No. 10/461,203 filed Jun. 12, 2003, Ser. No. 10/988,006 filed Nov. 12, 2004, and Ser. No. 11/269,939 filed Nov. 8, 2005. The content of each of these filings is incorporated herein by reference.

BACKGROUND OF THE INVENTION

Embodiments of the present invention relate generally to the field of presentation instruments. Particular embodiments relate to systems and methods for producing presentation instruments having verified account number information encoded on a magnetic stripe of the instrument.

Presentation instruments such as transaction cards, credit cards, debit cards, ATM cards, bank cards, stored value cards, gift cards, or the like, are well known for providing consumers with access to goods and services and are increasingly replacing other types of tender in consumer transactions. Such instruments may include a variety of different indicia to identify the instrument and other features, such as the instrument issuer, the customer, terms and conditions of use, or the like, depending in part on the type of instrument. The information may be printed on the instrument using alphanumeric characters, graphics, or the like, or may be embossed into the instrument.

In the case of flat card technology, a customer account number is typically printed on the front surface of the card, and encoded onto a magnetic stripe on the back of the card. However, certain difficulties may be associated with the production of such cards. For example, in some cases errors are made during the production process, and a card is produced which contains conflicting account number information.

Thus, despite recent advances in the field of presentation instrument technology, the need for improved approaches for producing presentation instruments remains an important challenge particularly as consumers continue to adopt the use of non-cash methods of payment. For example, there is an ongoing need for verification techniques that deliver enhanced efficiencies for producing just in time (JIT) manufactured flat plastic cards or consumer designed flat plastic cards. Embodiments of the present invention provide effective solutions to at least some of these needs.

BRIEF SUMMARY OF THE INVENTION

Advantageously, embodiments of the present invention provide solutions for ensuring that account number and other information is consistently and efficiently produced onto credit cards, debit cards, stored value cards, ATM cards, and other presentation instruments.

For many years, presentation instruments have been produced to include embossed lettering showing the customer's name, account number, expiration date, and the like. However, more recent designs such as flat cards do not include the raised lettering and numbering. Because flat cards can be quickly and easily produced, banks and other financial institutions are increasingly providing such unembossed presentation instruments to their customers. Unembossed cards can be issued instantly to a customer at an on-site location for immediate use, whereas embossed cards are typically created at a remote location and mailed to the customer which can take several days. By using flat cards, banks and other institutions can expedite the account opening process for their customers and users, as well as facilitate the retention of existing customers and users, for example when customer loses a card and needs a replacement. Relatedly, merchants are recognizing flat cards as a useful way to accept payment. Thus, the issuance and acceptance of flat cards lead to increased transaction volumes and customer loyalty.

In some cases, banks and other card providers can use a machine that prints the customer name, account number, validity date, security character, and the like, onto a preprinted card stock material. A customer can use the card to authorize a transaction based on data which is encoded or stored on the card, such as on a magnetic stripe, embedded memory chip, or other data storage mechanism.

In one aspect, embodiments of the present invention encompass methods for producing a presentation instrument. Exemplary methods include receiving an image file having an account number stamp, and producing the image file onto a piece of stock material, such that a visible account number corresponding to the account number stamp is created on the stock material. Methods also include scanning the visible account number with a reader, generating an account number record, encoding the account number record on the presentation instrument, and comparing the scanned visible account number with the encoded account number record. In some cases, the step of producing the image file onto the piece of stock material includes printing the visible account number using an unembossed printing procedure. In some cases, the reader includes an optical character recognition (OCR) reader. In some cases, the reader comprises a camera reader. Optionally, the presentation instrument may include a magnetic stripe, and the step of encoding the account number record on the presentation instrument can include encoding the account number record onto the magnetic stripe. According to some embodiments, the step of encoding the account number record on the presentation instrument includes encoding the account number record onto a bar code of the card. In some instances, the presentation instrument includes an RFID tag, and the step of encoding the account number record on the presentation instrument includes encoding the account number record onto the RFID tag.

In another aspect, embodiments of the present invention encompass methods for producing presentation instruments that can include receiving an image file having an account number stamp, producing the image file onto a piece of stock material, such that a visible account number corresponding to the account number stamp is created on the stock material, scanning the visible account number with a reader, generating an account number record based on the scanned visible account number, and encoding the account number record on the presentation instrument. In some cases, the step of producing the image file onto the piece of stock material can include printing the visible account number using an unembossed printing procedure. In some cases, the reader can include an optical character recognition (OCR) reader. In some cases, the reader can include a camera reader. In some methods, the presentation instrument includes a magnetic stripe, and the step of encoding the account number record on the presentation instrument includes encoding the account number record onto the magnetic stripe. Optionally, the step of encoding the account number record on the presentation instrument includes encoding the account number record onto a bar code of the card. According to some embodiments, the presentation instrument includes an RFID tag, and the step of encoding the account number record on the presentation instrument includes encoding the account number record onto the RFID tag.

In still another aspect, embodiments of the present invention include systems for producing a presentation instrument. Systems may include a processor that produces an image file having an account number stamp based on an original image file and an account number file, and a printing apparatus that prints the image file having the account number stamp onto a presentation instrument card stock, such that a visible account number corresponding to the account number stamp is created on the presentation instrument stock material. In some cases, systems include a reading apparatus that scans the visible account number on the presentation instrument stock material, an encoding apparatus that encodes an account number information corresponding to the scanned visible account number onto a storage medium of the presentation instrument, and a comparison module that compares the scanned visible account number with the encoded account number information. A printing apparatus can be configured to print the image file onto the presentation instrument card stock in an unembossed format. A reading apparatus can include an optical character recognition (OCR) reader. Similarly, a reading apparatus can include a camera reader. An encoding apparatus can be configured to encode the account number record on a magnetic stripe of the presentation instrument. Similarly, an encoding apparatus can be configured to encode the account number on a bar code of the presentation instrument.

According to some aspects, embodiments of the present invention encompass systems for producing a presentation instrument that include a processor and a printer. The processor can be configured to produce an image file having an account number stamp based on an original image file and an account number file. The printer can be configured to print the image file having the account number stamp onto a presentation instrument card stock, such that a visible account number corresponding to the account number stamp is created on the presentation instrument stock material. Systems may include a reader that scans the visible account number on the presentation instrument stock material, and an encoder that encodes an account number information corresponding to the scanned visible account number onto a storage medium of the presentation instrument.

In another aspect, embodiments of the present invention encompass computer program products for producing a presentation instrument. A computer program product can include code for receiving an image file having an account number stamp, code for producing the image file onto a piece of stock material, such that a visible account number corresponding to the account number stamp is created on the stock material, code for scanning the visible account number with a reader, code for generating an account number record, code for encoding the account number record on the presentation instrument, and code for comparing the scanned visible account number with the encoded account number record. A computer program product can also include a computer-readable medium for storing the codes.

In a further aspect, embodiments of the present invention encompass computer program products that include code for receiving an image file having an account number stamp, code for producing the image file onto a piece of stock material, such that a visible account number corresponding to the account number stamp is created on the stock material, code for scanning the visible account number with a reader, code for generating an account number record based on the scanned visible account number, code for encoding the account number record on the presentation instrument, and a computer-readable medium for storing the codes.

A further understanding of the nature and advantages of the present invention may be realized by reference to the remaining portions of the specification and the drawings wherein like reference numerals may be used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention provide techniques for verifying that account number is accurately produced onto presentation instruments such as credit cards, debit cards, stored value cards, gift cards, ATM cards, identification cards, and the like. Such techniques are well suited for optional use with on-site and on-demand issuance of flat or unembossed personalized magnetic stripe, contact, and contactless chip cards. For example, printing and encoding on the presentation instrument can be carried out at a branch location, for immediate delivery to a customer. Often, these approaches involve customizing a stock association-branded blank card with information specific to or selected by the customer.

Exemplary methods and systems for producing a presentation instrument can involve receiving an image file having an account number stamp, and producing the image file onto a piece of stock material, such that a visible account number corresponding to the account number stamp is created on the stock material. A reader can be used to scan the visible account number, and an account number record can be generated based on the scanned visible account number. Further, the account number record can be encoded on the presentation instrument.

Generating an Image File Having an Account Number Stamp

Embodiments of the present invention encompass any of a variety of techniques for producing an image file having an account number stamp. For example, a graphics editor or image manipulation program can be used to place an account number onto an image file. An image file may have an account number coded in metadata of the image file. In some cases, an original image file can be selected by a customer, and an account number stamp can be placed on that image file to produce a revised image file. When a revised image file is printed onto the presentation instrument, the image is visible with the account number superimposed thereon.

Figure 1:
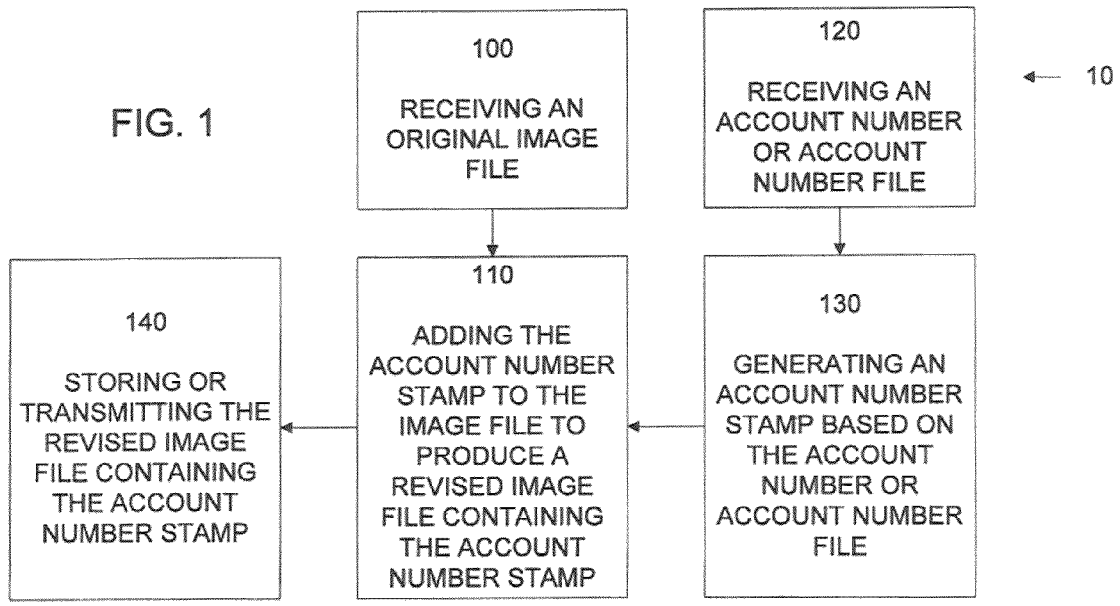
FIG. 1 illustrates aspects of a method for producing an image file having an account number stamp according to embodiments of the present invention.

Turning now to the drawings, FIG. 1 illustrates a process or method 10 for producing an image file having an account number stamp. As shown in step 100, the method can include receiving or inputting an original image file. In some cases, an original image file may be selected by or for a particular customer. The original image file can be in any of a variety of graphic file formats, including without limitation jif, jpe, jpeg, jpg, pcx, bmp, dib, rle, xif, g3f, g3n, fax, tiff, tif, gif, ico, cur, png, wmp, emf, pix, vst, icb, vda, targa, tga, pbm, ppm, pgm, pxm, wbmp, jp2, j2k, jpc, j2c, dcx, psd, PDF, PS, EPS, crw, cr2, nef, raw, pef, raf, x3f, bay, orf, srf, mrw, dcr, *.pcd, *.dcm; *.dic; *.dicom, AI, *.cut, *.avs, *.dpx, *.dot, *.cin, *.fpx, *.fits, *.hdf, *.mat, *.miff, *.mtv, *.palm, *.pcl, *.pict, *.pix, *.pwp, *.rla, *.sgi, *.sun, *.svg, *.ttf, *.vicar, *.viff, *.xbm, *.xcf, and *.xpm.

Step 110 involves adding an account number stamp to the image file, to produce a revised image file containing the account number stamp. The account number stamp can be produced by any of a variety of methods. For example, as shown in step 120, the method may include receiving an account number or account number file, and as shown in step 130, the method may also include generating an account number stamp based on the account number or account number file. Optionally, techniques may include storing or transmitting the revised image file containing the account number stamp, as indicated by step 140. In some instances, the image file may include account number information, for example as a metadata tag within the image file. Methods may include extracting or reading the account number information from the metadata and generating an account number stamp based on the account number information.

Figure 2:
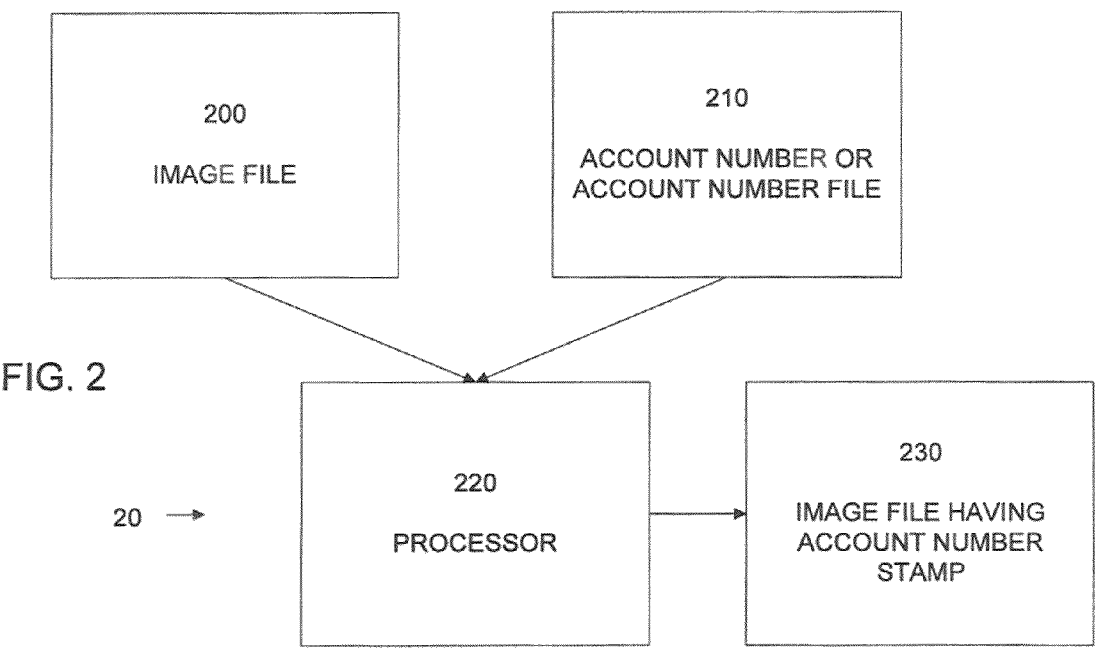
FIG. 2 illustrates aspects of a system for producing an image file having an account number stamp according to embodiments of the present invention.

FIG. 2 shows an exemplary system 20 for producing an image file having an account number stamp. System 200 includes a processor 220 that can receive an image file 200 and an account number or account number file 210. Processor 220 can be configured to produce an image file having an account number stamp 230 based on the image file and account number or account number file.

A blending procedure, which can be performed by a PhotoConvert unit as further discussed below, can be used to blend data file information into or with the image file information. In some embodiments, it is possible to blend in different account numbers. A template can refer to a position or location, such as vertical and horizontal coordinates, where a blend element is imposed on an original image file. An original image can be a background to a blend element. Blend elements may include numbers, text, logos, text, and the like.

Producing an Image File onto Stock Material

Figure 3:
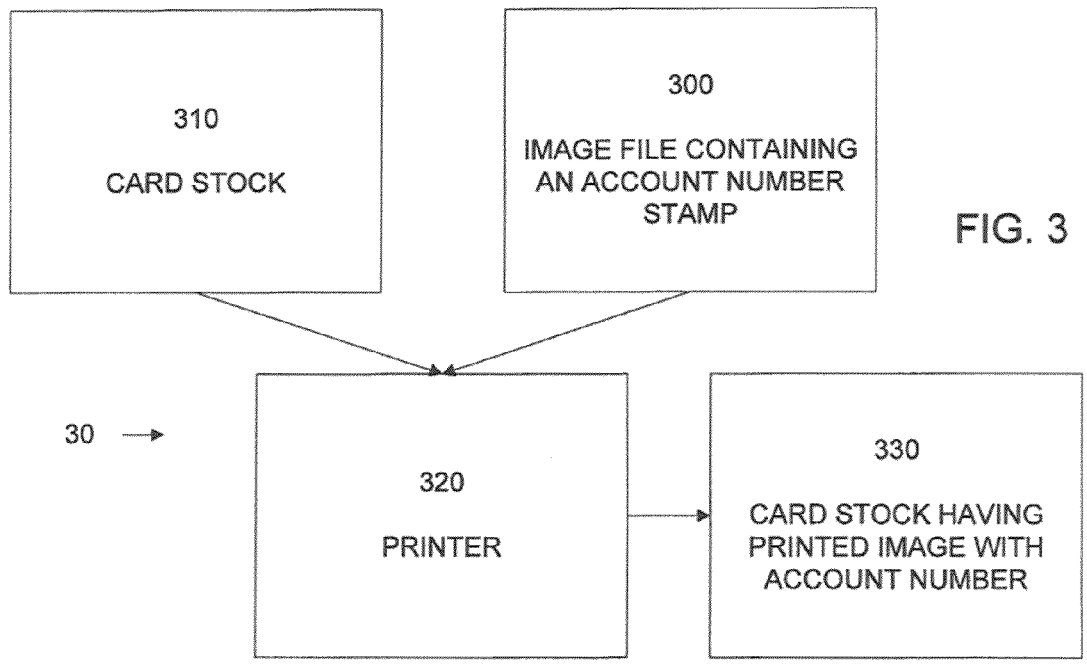
FIG. 3 depicts aspects of a system for producing an image file onto a piece of stock material according to embodiments of the present invention.
Figure 4:
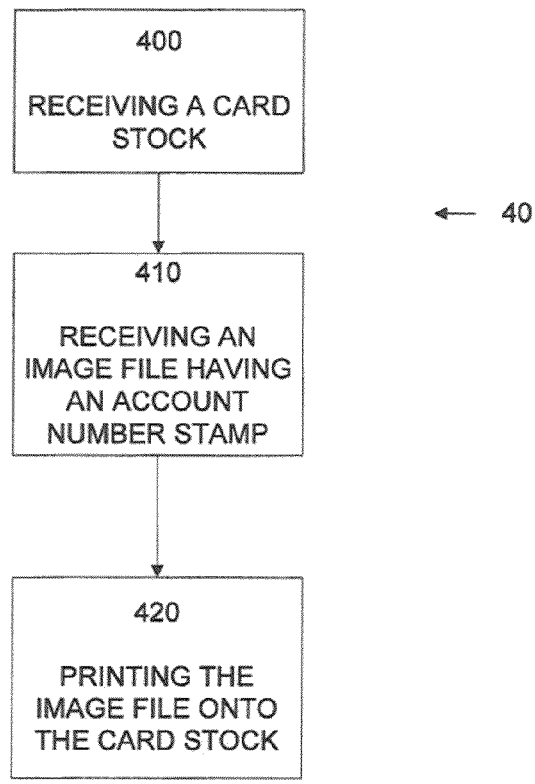
FIG. 4 shows aspects of a process for producing an image file onto a piece of stock material according to embodiments of the present invention.

FIG. 3 depicts an exemplary system 30 for producing an image file onto a piece of stock material. The system includes a printer 320 that can receive an image file having an account number stamp 300 and a card stock 310. Printer 320 is configured to print the image file onto the card stock, such that a visible account number, which corresponds to the account number stamp, is created on the stock material. FIG. 4 depicts an exemplary process 40 for producing an image file onto a piece of stock material. Typically, the process involves receiving a card stock, as indicated in step 400, and also receiving an image file having an account number stamp, as indicated in step 410. As illustrated by step 420, the process also includes printing the image file to the stock material, such that a visible account number, which corresponds to the account number stamp, is created on the stock material. In some cases, the stamp can be placed on the file without modifying parts of the image file, such as pixels, that are outside of the area which is stamped. Any of a variety of printing procedures may be used to produce the image file onto the presentation instrument stock material. For example, dye-sublimation technology can be used to print the image to a film, and to fuse the film to the surface of the stock material. In some cases, HP Indigo press technology can be used when producing an image file onto stock material. Digital print technology can be used to provide short run printing, down to a run of one, while delivering liquid ink offset printing quality. This technology also allows for a wide range of printing substrates, including traditional paper and PVC, which can be used in card construction. Exemplary printing procedures can use unembossed techniques for applying an image on to the stock material.

Reading the Account Number Image

Figure 5:
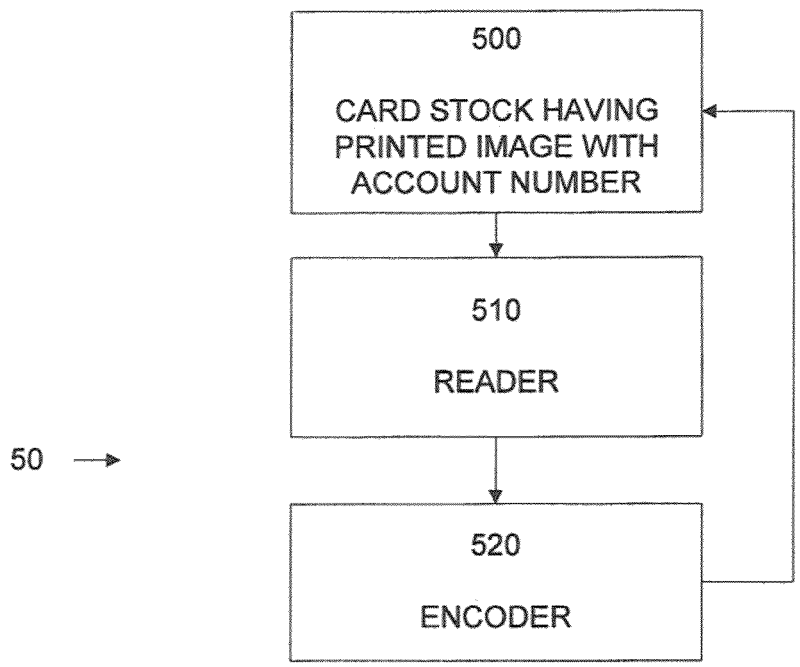
FIG. 5 depicts aspects of a system for reading or scanning an account number which is present on a card stock according to embodiments of the present invention.

Any of a variety of approaches can be used to read or scan the visible account number on the presentation instrument, and to generate an account number record based on the scanned visible account number. For example, techniques may include optical character recognition (OCR) to read the account number and generate a record or electronic file for additional processing. For example, OCR technology can be used to generate a bitmap or other data file corresponding to the scanned image. FIG. 5 depicts an exemplary system 50 for reading or scanning an account number which is present on a card stock. The system includes a reader 510 that can read or scan an account number printed on card stock 500. The reader, or a processor in operative association with the reader, can be configured to generate an account number record based on the scanned visible account number. In some embodiments, a reader can include a camera reading device. Reading mechanisms can be used to read the attributes of what is on the card.

Encoding the Account Number Data onto the Presentation Instrument

Figure 6:
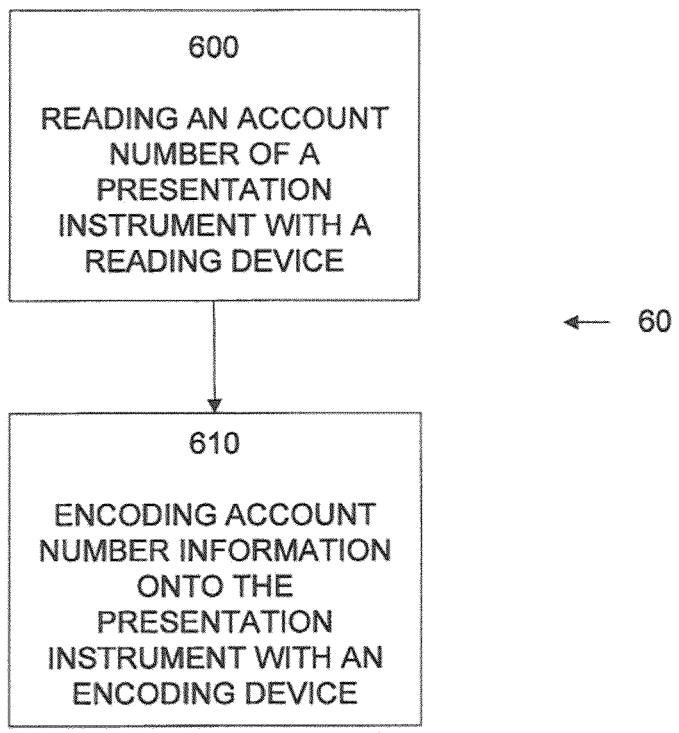
FIG. 6 shows aspects of a method for reading account number information from, and encoding account number information to, a card stock according to embodiments of the present invention.

With continuing reference to FIG. 5, an exemplary system 50 may include an encoder 520 which can receive information corresponding to the scanned account number, and which can encode account number information onto the card stock 500. For example an encoding device can encode an account number record onto the presentation instrument. Relatedly, FIG. 6 shows an exemplary process 60 for reading account number information from, and encoding account number information to, a card stock. Step 600 includes reading or scanning an account number of a presentation instrument with a reading or scanning device. For example, this step may include reading an account number that is printed on a card stock material. Step 610 includes encoding or writing account number information onto the presentation instrument with an encoding or writing device. Typically, a presentation instrument or card may have include or be affixed with an information storage medium suitable for encoding a unique identifier. In some embodiments, the information storage medium may include a magnetic stripe, a bar code, or an RFID device, for example. Often, the account number information is encoded onto a magnetic stripe which contains magnetic particles in a resin material. Magnetic stripe particles may include iron oxide, barium ferrite, and the like. During an encoding process, the particles can be magnetized in a particular direction (e.g. north or south pole), which is a way of writing information on the stripe. Any of a variety of ISO encoding standards may be used when encoding the account number information onto the magnetic stripe. It is understood that other encoding techniques can be employed depending on the nature of the presentation instrument and the storage medium thereof. For example, smart cards having an integrated circuit chip can encoded using the techniques described herein. Similarly, contactless cards can be encoded with magnetic field or radio frequency devices. In some cases, cards may include a magnetic stripe and a chip, and methods may include encoding the magnetic stripe, the chip, or both.

Because the encoding or writing devices uses information based on the printed account number, the identity of the information which is encoded on the presentation is known. This technique is well suited for use in the production of any of a variety of presentation instruments, including without limitation credit cards, debit cards, ATM cards, gift cards, loyalty cards, calling cards, membership cards, electronic benefit transfer cards, driver's licenses, hotel key cards, transportation cards such as bus cards and train cards, and the like.

Figure 7:
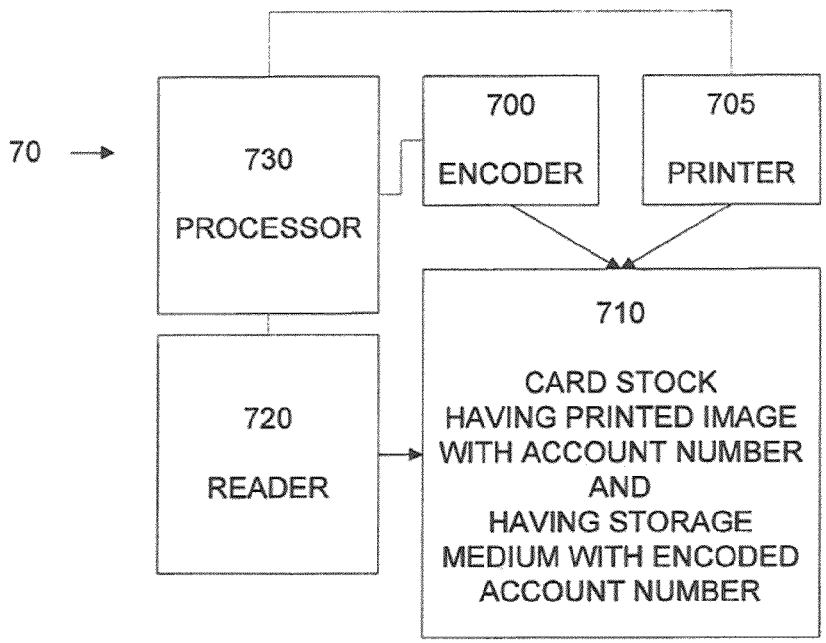
FIG. 7 illustrates aspects of a system for reading or scanning an account number which is present on a card stock according to embodiments of the present invention.
Figure 8:
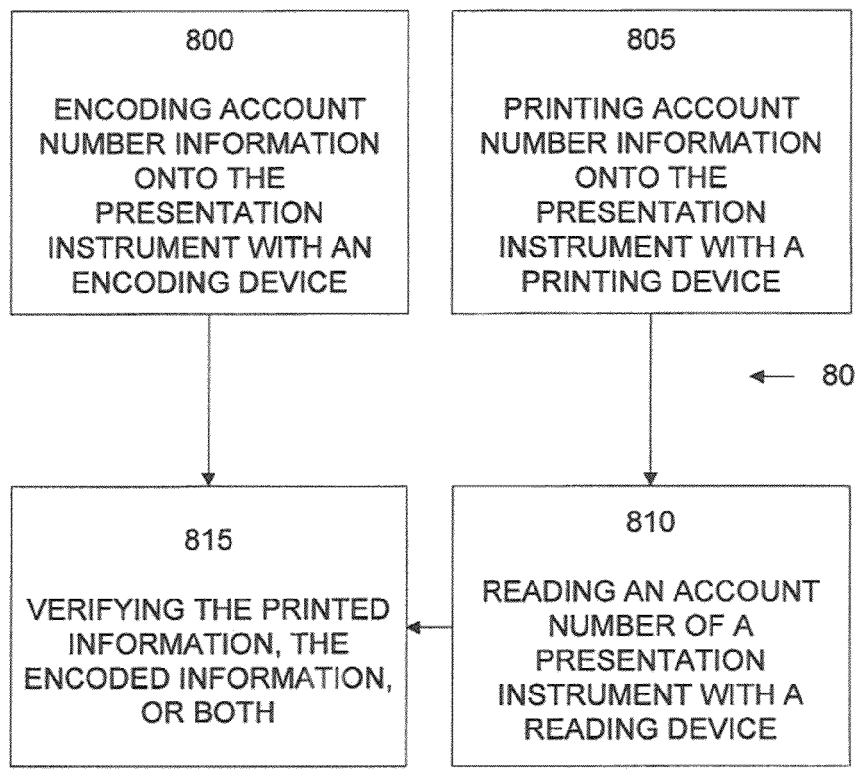
FIG. 8 depicts aspects of printing, encoding, and verification methods according to embodiments of the present invention.

As used herein, terms such as "stored value card" or "presentation instrument" encompass a presentation instrument that has a pre-determined amount of monetary value or unique identifier associated with it. The value may be physically encoded on the card or may be stored in a database that is accessed through a network when the card is presented for use to determine whether the card has sufficient value for the specific use. The card typically will have an information encoding region on it, which may be a magnetic stripe, a bar code, a "chip," a radio frequency identification tag (RFID), or any other information encoding region. In some cases, a card can have an information encoding or storage region that includes a contactless integrated circuit. In some case, the information encoding or storage medium can include an integrated circuit having an antenna for transmitting and receiving data at the instrument. The term "card" is to be interpreted broadly so as to include fobs and such devices that interact with point-of-sale equipment to settle a transaction. Terms such as "stored value card" and "presentation instrument" are often used interchangeably throughout the instant disclosure In addition to the pre-encoding verification schemes discussed above with reference to FIGS. 5 and 6, embodiments of the present invention also encompass post-encoding verification schemes as discussed below. FIG. 7 illustrates an exemplary system 70 for reading or scanning an account number which is present on a card stock, where the card stock also includes encoded information. The system includes an encoder 700 for encoding account number information on the card stock 710, and a printer 705 for printing account number information on the card stock 710. Further, the system includes a reader 720 for reading account number information which is printed on the card stock. System 70 also includes a processor 730 that compares printed account number information with encoded account number information, for example to verify whether account number data has been accurately encoded onto the card, accurately printed onto the card, or both. Processor 730 may be coupled or in operative association with encoder 700, printer 705, reader 720, or any combination thereof. Relatedly, FIG. 8 shows an exemplary process 80 for printing and encoding account number information onto a presentation instrument, and verifying the printed account number information, or verifying the encoded account number information, or both. Step 800 includes encoding account number information onto the presentation instrument with an encoding device. Step 805 includes printing account number information onto the presentation instrument with a printing device. Step 810 includes reading an account number of a presentation instrument with a reading device. Step 815 includes verifying the printed information, the encoded information, or both. For example, this step may include comparing account number information which is encoded on card stock with account number information which is printed on the card stock, and determining whether the encoded account number information matches the printed account number information.

Image Preparation

Figure 9:
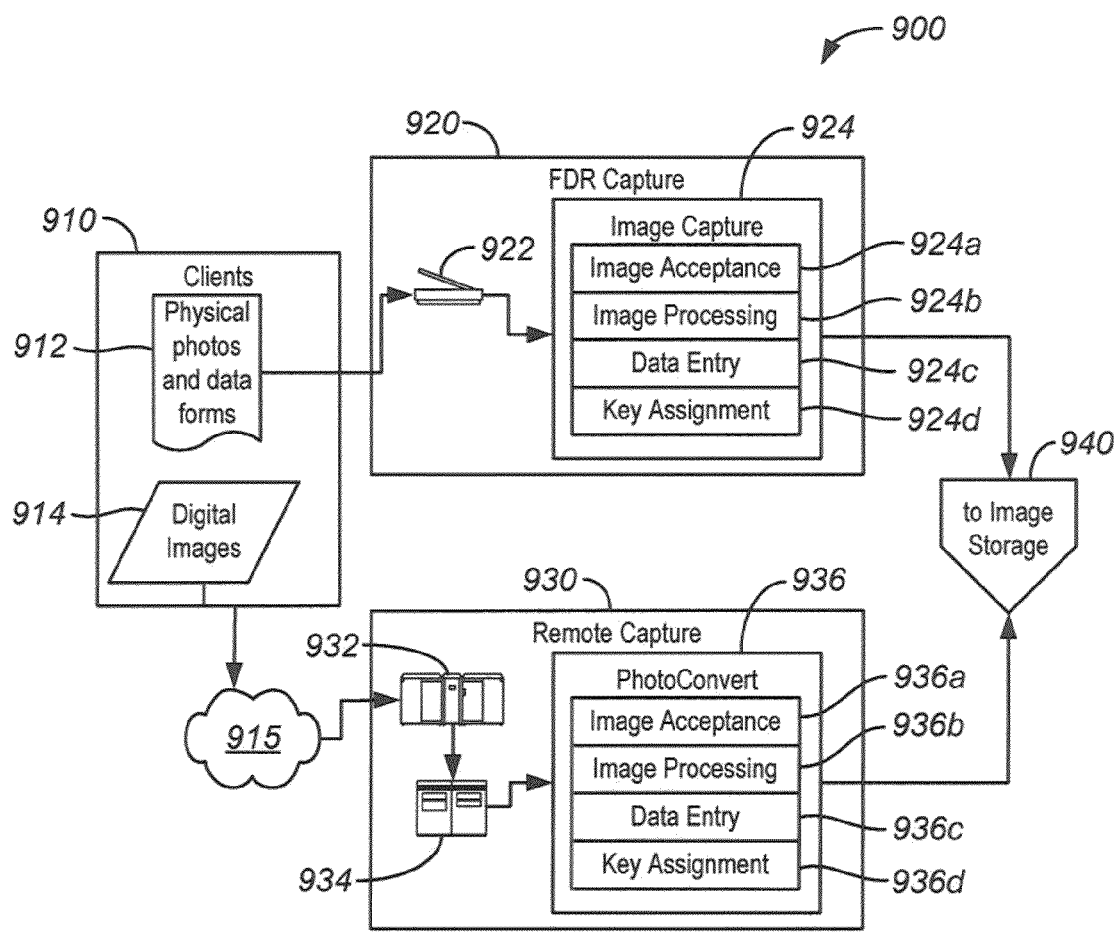
FIG. 9 illustrates aspects of a system for image preparation according to embodiments of the present invention.

FIG. 9 illustrates aspects of a system 900 for image preparation, according to embodiments of the present invention. System 900 includes a Clients module 910 in operative association with a Capture module 920 and a Remote Capture module 930. In some instances, Capture module 920 can include a capture module maintained or operated by First Data Resources. Clients module 910 represents different approaches which clients may use to provide images. For example, a client may provide a physical item 912 such as a photo or a data form. Optionally, a client may provide a digital image 914. When a client provides a physical photo or data form, the physical photo or data form can be scanned by a scanner 922 of FDR module 920. An image capture submodule 924 of FDR Capture module 720 includes an Image Acceptance unit 924a, an Image Processing unit 924b, a Data Entry unit 924c, and a Key Assignment unit 924d. As shown in FIG. 9, a digital image 914 provided by the client can be transmitted to Remote Capture module 930 via a network 915 such as the internet Image 914 may also be transmitted through a mainframe 932 of Remote Capture module 930. Similarly, image 914 may be transmitted through a system 934 such as a platform, a server, a minicomputer, or the like. For example, system 934 may include an IBM AS/400 minicomputer. Digital image 914 may also be transmitted to a PhotoConvert module 936 of Remote Capture module 930. As shown here, PhotoConvert module 936 includes an Image Acceptance unit 936a, an Image Processing unit 936b, a Data Entry unit 936c, and a Key Assignment unit 936d. Digital image information can be transmitted from FDR Capture module 920, or from Remote Capture module 930, to Image Storage module 940.

Image Storage

Figure 10:
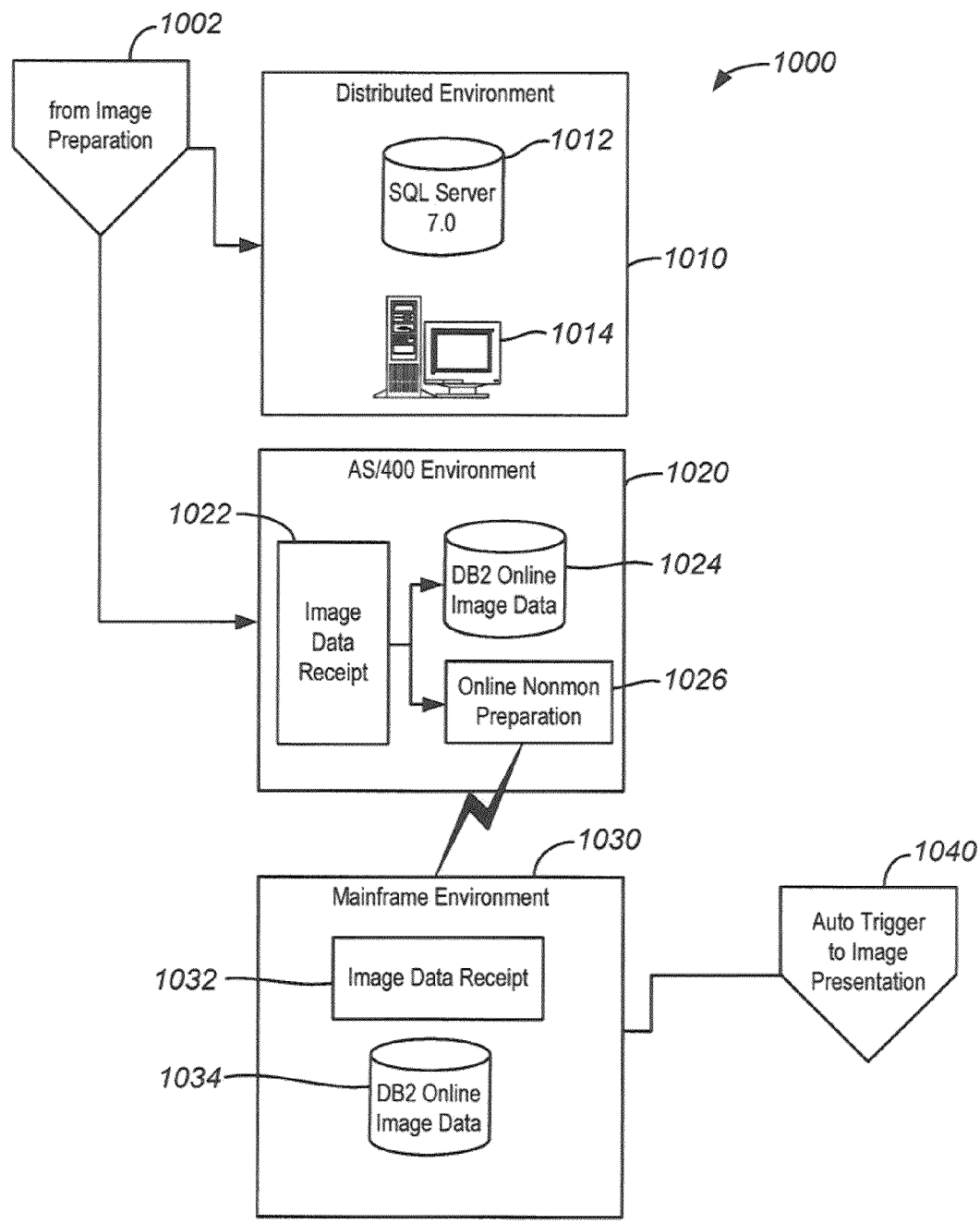
FIG. 10 shows aspects of a system for image storage according to embodiments of the present invention.

FIG. 10 illustrates aspects of a system 1000 for image storage, according to embodiments of the present invention. System 1000 can include a Distributed Environment module 1010 that can receive transmitted digital image information from Image Preparation module 1002. As shown here, a Distributed Environment module 1010 can include an SQL Server 7.0 1012 and an Image File Server 1014. System 1000 can include an AS/400 Environment module 1020 that can receive transmitted digital image information from Image Preparation module 1002. As shown here, an AS/400 Environment module 1020 can include an Image Data Receipt unit 1022, in operative association with a DB2 Offline Image Data unit 1024 and an Online Nonmon Preparation unit 1026. System 1000 can include a Mainframe Environment module 1030 which may be in operative association with AS/400 Environment module 1020. As shown here, Mainframe Environment module 1030 includes an Image Data Receipt unit 1032 and a DB2 Online Image Data unit 1034. System 1000, optionally via Mainframe Environment 1030, can be in operative association with an Auto-Trigger to Image Presentation module 1040. In some cases, auto-trigger refers to an emboss request that is generated automatically upon successful processing of an image.

Image Presentation

Figure 11:
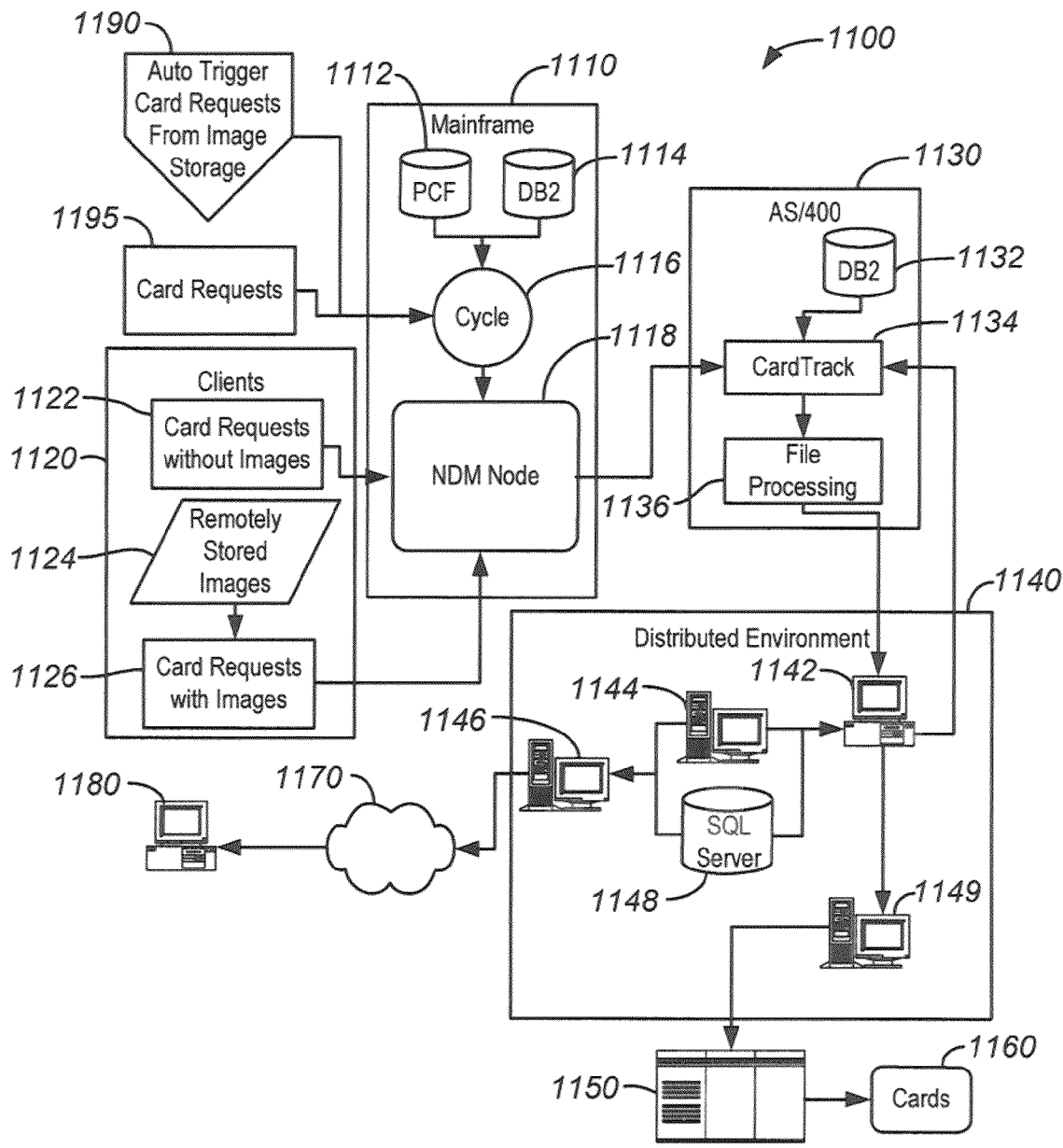
FIG. 11 depicts aspects of a system for image presentation according to embodiments of the present invention.

FIG. 11 illustrates aspects of a system 1100 for image presentation, according to embodiments of the present invention. System 1100 includes a Mainframe module 1110 in operative association with a Client module 1120 and an AS/400 Module 1130. System 1100 also includes a Distributed Environment module 1140. As shown here, Mainframe module 1110 includes a PCF unit 1112 and a DB2 unit 1114 in operative association with a Cycle unit 1116. In turn, Cycle unit 1116 is in operative association with an NDM Node unit 1118. Cycle 1116 can be configured to receive data from Auto-Trigger Card Requests from Image Storage module 1190 or Card Requests module 1195. Clients module 1120 can include a Card Requests Without Images unit 1122, and a Remotely Stored Images unit 1124 in operative association with a Card Requests With Images unit 1126. Card Requests Without Images unit 1122 and Card Requests With Images unit 1126 can be in operative association with NDM Node unit 1118 of Mainframe module 1110. AS/400 Module 1130 can include a DB2 unit 1132, a CardTrack unit 1134, and a File Processing unit 1136. CardTrack unit 1134 can be in operative association with DB2 1132. CardTrack unit 1134 can be configured to receive data from NDM Node unit 1118 of Mainframe module 1110. CardTrack unit 1134 can also be configured to receive data from a Merge Station unit 1142 of the Distributed Environment module 1140. CardTrack unit 1134 can embody a card personalization tracking and management system, and can be used for internal and external tracking/monitoring of the fulfillment of personalized plastic requests. File Processing unit 1136 can be configured to transmit data to Merge Station unit 1142 of the Distributed Environment module 1140. Distributed Environment module 1140 can include a Merge Station unit 1142, an Image Server unit 1144, a Web Server unit 1146, an SQL Server unit 1148, and a Production Server 1149. As shown here, Merge Station unit 1142 can receive information from Image Server unit 1144, from File Processing unit 1136, and from SQL Server 1148. Merge Station unit 1142 can transmit information to CardTrack unit 1134 and Production Server 1149. Image Server 1144 can transmit information to Merge Station unit 1142 and to Web Server unit 1146. Web Server unit 1146 can receive information from SQL Server unit 1148 and Image Server unit 1144, and can transmit information to network 1170. SQL Server unit 1148 can transmit information to Web Server unit 1146 and Merge Station unit 1142. Production Server unit 1149 can receive information from Merge Station 1142, and can transmit information to Datacard Equipment unit 1150. Network 1170 can receive information from Web Server unit 1146 and can transmit information to Web Client unit 1180. Datacard Equipment unit 1150 can receive information from Production Server unit 1149, and can transmit information to one or more cards 1160.

A personalized photo can include individual image that is assigned to an individual card. A catalog photo can include a reusable image that is assigned via a non-mon procedure to one or more cards. An auto-trigger procedure can include an emboss request that is generated automatically upon successful processing of an image. A blend can include a BIN number, or text, or an image that is blended into the image. The blending can occur at the time of card production. Images can be reusable across BIN numbers and card layouts. A layout of blends can vary by cardstock or virtual cardstock A virtual cardstock can include a cardstock number with no physical inventory used to define special behaviors.

According to some embodiments, methods may include selecting different account numbers to create a blend. In some cases, image file information and data file information can be received from different sources, and the image file information and data file information can be cross referenced. A fulfillment request may include a cardholder name, an account number, an expiration date, or the like. In some cases, a fulfillment request may include items or information that have historically been embossed on a card. A fulfillment request can be generated by a client, and used to create a blend element. The blend element can be imposed on a template area of a card. In some cases, a client can include a financial institution. In some cases, a client can include a consumer or end user.

Embodiments of the present invention encompass both pre-encoding verification and post-encoding verification techniques. In a pre-encoding verification approach, an account number on a blend can be interrogated with a reading mechanism, and information based on the interrogated account number can be used to develop account number information or track data which can be encoded on a magnetic stripe of a card. In a post-encoding verification approach, an account number on a blend of the card can be interrogated, and an account number or track data encoded on a magnetic stripe of the card can be interrogated, and the results of both interrogations can be compared.

System and method embodiments may provide various options. For example, embodiments may include a combination of personalized photos, white cardstock, auto-trigger, and a single-blend layout. Some embodiments may include a personalized photo, a virtual cardstock, auto-trigger, and a unique blend layout per virtual cardstock. Some embodiments may include a catalog photo, and auto-trigger would not apply. Some embodiments may include a small quantity replacement. Virtual cardstock can be used to define an image and blank plastic combination. Some embodiments may include larger development, which can include automatically waiting for an image to arrive. Certain approaches can "revolve" to a report if image is not available, and "revolve off" after certain number of days.

Each of the devices or modules of the present invention can include software modules on a computer readable medium that is processed by a processor, hardware modules, or any combination thereof. Any of a variety of commonly used platforms, such as Windows, MacIntosh, and Unix, along with any of a variety of commonly used programming languages, may be used to implement the present invention. It is appreciated that systems can be configured to carry out various methods of the present invention. Each of the devices or modules of the present invention can include software modules on a computer readable medium that is processed by a processor, hardware modules, or any combination thereof. Any of a variety of commonly used platforms, such as Windows, MacIntosh, and Unix, along with any of a variety of commonly used programming languages, may be used to implement the present invention.

Systems may include a hard disk drive, a floppy disk drive along with associated removable media, a Compact Digital Read Only Memory (CD-ROM) drive, an optical drive, DVD, CD-R, CD-RW, solid-state removable memory, other removable media cartridges or disks, and the like. In some embodiments, the software or code will provide protocol to allow the system to carry out aspects of the methods disclosed herein.

It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed. A system itself can be of varying types including a computer terminal, a personal computer, a portable computer, a workstation, a network computer, or any other data processing system. Due to the ever-changing nature of computers and networks, the description of systems herein is intended only as a specific example for purposes of illustrating one embodiment of the present invention. Many other configurations of systems are possible having more or less components than the computer systems depicted herein. Relatedly, any of the hardware and software components discussed herein can be integrated with or configured to interface with other components of a the system.

The above provides a full and complete disclosure of certain embodiments of the present invention for purposes of clarity and understanding. Having described several embodiments, it will be recognized by those of skill in the art that various modifications, alternative constructions, and equivalents may be used without departing from the spirit of the invention. The present invention encompasses systems which can carry out the methods described herein, and similarly encompasses methods for which the systems described herein may be used. Additionally, a number of well known processes and elements have not been described in order to avoid unnecessarily obscuring the present invention. For example, those skilled in the art know how to arrange computing devices into a network and configure communication among them. Accordingly, the above description should not be taken as limiting the scope of the invention, which is defined in the following claims.

What is claimed is:

1. A just in time manufacturing method for producing a presentation instrument for issuance to a customer at an on-site location, comprising:
   receiving an image file having an account number stamp;
   producing the image file onto a piece of stock material at the on-site location, such that a visible account number corresponding to the account number stamp is created on the stock material, the visible account number comprising an unencoded number;
   scanning the visible account number with a reader at the on-site location;
   generating an account number record;
   encoding the account number record on the presentation instrument at the on-site location; and
   comparing the scanned visible account number with the encoded account number record.

2. The method of claim 1, wherein the step of producing the image file onto the piece of stock material comprises printing the visible account number using an unembossed printing procedure.

3. The method of claim 1, wherein the reader comprises an optical character recognition (OCR) reader.

4. The method of claim 1, wherein the reader comprises a camera reader.

5. The method of claim 1, wherein the presentation instrument comprises a magnetic stripe, and the step of encoding the account number record on the presentation instrument comprises encoding the account number record onto the magnetic stripe.

6. The method of claim 1, wherein the step of encoding the account number record on the presentation instrument comprises encoding the account number record onto a bar code of the card.

7. The method of claim 1, wherein the presentation instrument comprises an RFID tag, and the step of encoding the account number record on the presentation instrument comprises encoding the account number record onto the RFID tag.

8. A just in time manufacturing method for producing a presentation instrument for issuance to a customer at an on-site location, comprising:
   receiving an image file having an account number stamp;
   producing the image file onto a piece of stock material at the on-site location, such that a visible account number corresponding to the account number stamp is created on the stock material, the visible account number comprising an unencoded number;
   scanning the visible account number with a reader at the on-site location;
   generating an account number record based on the scanned visible account number; and
   encoding the account number record on the presentation instrument at the on-site location.

9. The method of claim 8, wherein the step of producing the image file onto the piece of stock material comprises printing the visible account number using an unembossed printing procedure.

10. The method of claim 8, wherein the reader comprises an optical character recognition (OCR) reader.

11. The method of claim 8, wherein the reader comprises a camera reader.

12. The method of claim 8, wherein the presentation instrument comprises a magnetic stripe, and the step of encoding the account number record on the presentation instrument comprises encoding the account number record onto the magnetic stripe.

13. The method of claim 8, wherein the step of encoding the account number record on the presentation instrument comprises encoding the account number record onto a bar code of the card.

14. The method of claim 8, wherein the presentation instrument comprises an RFID tag, and the step of encoding the account number record on the presentation instrument comprises encoding the account number record onto the RFID tag.

15. A system for producing a presentation instrument at an on-site location, comprising:
   a processor that produces an image file having an account number stamp based on an original image file and an account number file;
   a printing apparatus that prints the image file having the account number stamp onto a presentation instrument card stock at the on-site location, such that a visible account number corresponding to the account number stamp is created on the presentation instrument stock material, the visible account number comprising an unencoded number;
   a reading apparatus that scans the visible account number on the presentation instrument stock material at the on-site location;
   an encoding apparatus that encodes an account number information corresponding to the scanned visible account number onto a storage medium of the presentation instrument at the on-site location; and a comparison module that compares the scanned visible account number with the encoded account number information.

16. The system of claim 15, wherein the printing apparatus is configured to print the image file onto the presentation instrument card stock in an unembossed format.

17. The system of claim 15, wherein the reading apparatus comprises an optical character recognition (OCR) reader.

18. The system of claim 15, wherein the reading apparatus comprises a camera reader.

19. The system of claim 15, wherein the encoding apparatus is configured to encode the account number record on a magnetic stripe of the presentation instrument.

20. The system of claim 15, wherein the encoding apparatus is configured to encode the account number on a bar code of the presentation instrument.

* * * * *